(12) United States Patent
Gateau (10) Patent No.: US 12,163,308 B2
(45) Date of Patent: Dec. 10, 2024

(54) CONSTRUCTION EQUIPMENT

(71) Applicant: Volvo Construction Equipment AB, Eskilstuna (SE)

(72) Inventor: Alexandre Gateau, Tresserve (FR)

(73) Assignee: Volvo Construction Equipment AB, Eskilstuna (SE)

( * ) Notice: Subject to any disclaimer, the term of this patent is extended or adjusted under 35 U.S.C. 154(b) by 520 days.

(21) Appl. No.: 17/591,155

(22) Filed: Feb. 2, 2022

(65) Prior Publication Data
US 2022/0243421 A1 Aug. 4, 2022

(30) Foreign Application Priority Data

Feb. 2, 2021 (EP) .................................... 21305136

(51) Int. Cl.
*H02K 7/06* (2006.01)
*E02F 3/42* (2006.01)
*E02F 9/20* (2006.01)

(52) U.S. Cl.
CPC .............. *E02F 3/425* (2013.01); *E02F 9/202* (2013.01)

(58) Field of Classification Search
CPC .. E02F 3/32–3/439; E02F 9/202; E02F 9/207; F16H 25/20–2025/249; H02K 7/06
See application file for complete search history.

(56) References Cited

U.S. PATENT DOCUMENTS

2018/0287458 A1 10/2018 Parmar et al.

FOREIGN PATENT DOCUMENTS

| CN | 203008004 U | 6/2013 |
|----|-------------|--------|
| CN | 208395875 U | 1/2019 |
| CN | 110528606 A | 12/2019 |
| CN | 110984263 A | 4/2020 |
| JP | 2004210493 A | 7/2004 |
| WO | 2013114451 A1 | 8/2013 |
| WO | 2016097784 A1 | 6/2016 |

OTHER PUBLICATIONS

First Korean Office Action for Korean Patent Application No. 10-2022-0013352 mailed Jul. 28, 2023, 16 pages (including English translation and Korean Agent's reporting letter).
Extended European Search Report dated Aug. 11, 2021 for European Patent Application No. 21305136.0, 7 pages.
Wiki MECA, Helical connection, downloaded on Feb. 1, 2022 from: https://www.wikimeca.org/index.php/Liaison_h%C3%A9lico%C3%AFdale.

(Continued)

*Primary Examiner* — Ramon M Barrera
(74) *Attorney, Agent, or Firm* — Sage Patent Group (57) ABSTRACT

A construction equipment includes an electric actuator including a rod extending along a longitudinal axis, a sliding member movable along the rod, an electric motor for converting electrical power into a movement of the sliding member along the longitudinal axis, a connecting rod including a first end which is articulated on sliding member and a second end which is articulated on a first element of the construction equipment in order to move the first element relative to a second element or inversely and guiding means for guiding the movement of the sliding member the longitudinal axis. The electric motor, the rod and the sliding member are integrated into the second element of the construction equipment.

15 Claims, 10 Drawing Sheets

(56) References Cited

OTHER PUBLICATIONS

Wikipedia, Roller screw, downloaded on Feb. 1, 2022 from: https://en.wikipedia.org/wiki/Roller_screw.
Wikipedia, Ball screw, downloaded on Feb. 1, 2022 from: https://en.wikipedia.org/wiki/Ball_screw.
Wikipedia, Linear motor, downloaded on Feb. 1, 2022 from: https://en.wikipedia.org/wiki/Linear_motor.
Wikipedia (France), Safety brake, downloaded on Feb. 1, 2022 from: https://fr.wikipedia.org/wiki/Frein_de_s%C3%A9curit%C3%A9.

CONSTRUCTION EQUIPMENT

CROSS-REFERENCE TO RELATED APPLICATION

The present application claims benefit of priority to European Patent Application No. 21305136.0, filed Feb. 2, 2021, and is assigned to the same assignee as the present application and is incorporated herein by reference.

TECHNICAL FIELD

The present disclosure relates to a construction equipment, specifically to a fully electrically driven construction equipment.

Some embodiments are applicable on working machines within the fields of industrial construction machines or construction equipment, in particular excavators and articulated haulers. Although some embodiments will be mainly described with respect to an excavator, some embodiments are not restricted to this particular machine, but may also be used in other working machines such as articulated haulers, dump truck and backhoe loaders, loaders, skid steer loaders, as far as it is equipped of linear cylinders to drive the movement of the equipment.

BACKGROUND

In recent years, there has been a clear trend towards the electrification of vehicles, and thus a move away from the use of fossil fuels that cause greenhouse gas emissions. Electric vehicles also have the advantage of being much quieter than their thermal counterparts.

This trend is now spreading to construction machinery which, until now, has included a combustion engine driving a hydraulic pump. Gradually, internal combustion engines will be replaced by electric motors. There are also solutions to replace the hydraulic system and the various cylinders that make it up. Today, the solution mainly consists of replacing the hydraulic cylinders with electric cylinders. In practice, however, this poses many problems, including bulk, exposure to shocks and above all potentially irreversible deformation or wear, or even breakage, caused by the induced forces.

It is well known that during certain operations, such as the digging or dumping phases, relatively large forces are applied in the axis of the linear actuators. Traditionally, i.e. with hydraulic cylinders, pressure limiters in the form of safety valves are used, which allow part of the oil contained inside the cylinder to be evacuated and thus limit the mechanical stresses induced on the cylinder body and the rod. However, and to the knowledge of the Applicant, nobody has so far succeeded in solving this problem with electric cylinders, with performances similar to that of hydraulic cylinders.

US 2018 287458 A proposes an original design of electric cylinder, in which the electric motor is housed inside the cylinder rod. This electric motor drives a threaded hub which engages inside a cylinder forming the cylinder body. Although this design of electric actuator is rather original, it is not certain that it solves the problems of deformation or breakage related to the induced forces and the above mentioned electric cylinder, which is fragile, remains exposed to potential external shocks.

On the other hand, CN110984263 proposes an electric excavator, in which the hydraulic cylinders are replaced by electric actuators, which comprise an electric motor driving an actuating rod through a wheel and worm, the rod comprising a first end attached to the wheel and a second end attached to the mobile part of the excavator, such as a segment of the articulated arm.

In another register, CN110528606A discloses a kind of excavator, in which the mast is mounted on a lifting platform. The lifting platform is moved vertically by means of a scissor mechanism, which is driven by an electric actuator. This actuator consists of an electric motor driving a threaded rod in rotation, which passes through a threaded hole delimited by a carriage. The rotation of the threaded rod around its axis causes the translational movement along the axis of the rod. One of the bars of the scissor mechanism is articulated on the carriage, so that the movement of the carriage causes the platform to move in a vertical direction.

Finally, CN 208395875 U discloses a geotechnical system for excavating the location of foundation pillars.

SUMMARY

An object of some embodiments is to provide a simple, effective, robust and economical solution to replace hydraulic cylinders of a construction equipment with electric actuators. In detail, the integration of the actuator(s) inside the equipment offers large possibilities to fit the components of the actuator(s) and adopt an appropriate sizing. This solution will make it possible to propose fully electrically driven construction equipment on the market.

The object is achieved by a construction equipment according to claim 1, comprising at least one electric actuator including:
 a rod, extending along a longitudinal axis;
 a sliding member, movable along the rod;
 an electric motor, for converting electrical power into a movement of the sliding member along the longitudinal axis;
 a connecting rod, comprising a first end which is articulated on sliding member and a second end which is articulated on a first element of the construction equipment, in order to move the first element relative to a second element or inversely; and
 guiding means for guiding the movement of the sliding member along the longitudinal axis.

According to some embodiments, at least the electric motor, the rod and the sliding member are integrated into said second element of the construction equipment.

Advantageously, guiding means are fixed relative to second element or integral with said second element.

The electric actuator(s) with which the construction equipment according to some embodiments is equipped are build up from simple elements "off the shelf" whose performance, durability and efficiency have been proven in the past. Moreover, the guiding means and the integration of sensitive elements of the actuators into the construction equipment enables to achieve very promising results in terms of robustness, durability and efficiency.

Moreover, and thanks to the usage of an electric motor, energy recovery can be applied through the electric motor acting as generator, during driven movements, typically when excavator boom is moving down under gravity.

Advantageously, the construction equipment of some embodiments includes the following (optional) features:
 Sliding member and rod form a helical link.
 Helical link is achieved using a ball screw or roller screw mechanism.
 Sliding member and rod form a slide link.

The electric motor is a linear motor, comprising the sliding member as a rotor and the rod as a stator.

Said second element delimits an opening, typically a slot, for the passage of the connecting rod.

Said second element is part of the metallic structure of the construction equipment.

The construction equipment further comprises a static brake to hold the sliding member in place when electrical power is removed from the electric motor.

The first and second ends of connecting rod are each articulated about a pivot axis perpendicular to the longitudinal axis.

Said second element of the construction equipment ensures guiding of the sliding element. This means that it is the second element of the equipment which acts as guiding means.

Guiding means includes at least one rail extending through a hole of sliding member.

BRIEF DESCRIPTION OF THE DRAWINGS

With reference to the appended drawings, below follows a more detailed description of embodiments cited as examples. In the drawings.

DETAILED DESCRIPTION

Figure 1:
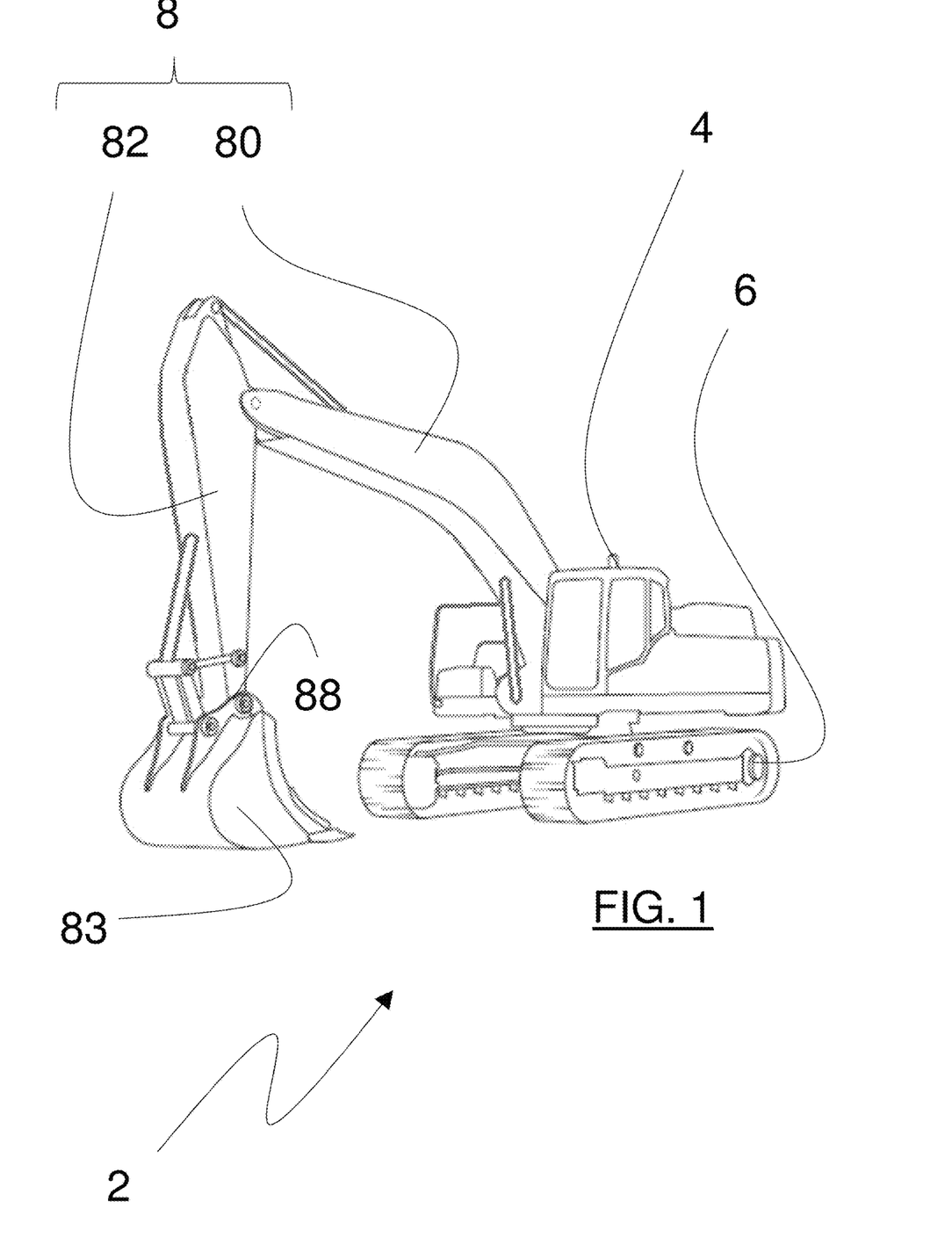
FIG. 1 is a perspective view of a construction equipment, e.g. an excavator, according to some embodiments.

FIG. 1 shows a construction equipment 2 (also referred to as a "construction machine" or "work machine"), which in the example is an excavator. Obviously, and as mentioned above, some embodiments is not limited to this particular example as it can be applied to any other construction machine.

The construction machine 2 comprises an upper frame (also known as "platform") 4 that can be pivoted around a vertical axis. The upper frame 4 includes the driver cab. It is rotationally mounted on a lower frame equipped with a pair of continuous tracks 6, e.g. caterpillars tracks 6.

The excavator 2 further includes an excavator arm 8, which comprises a boom 80 that is rotatable relative to the upper frame 4 and a dipper 82 (also known as "stick" or "arm") that is rotatable relative to the boom 80. Besides, a tool 83, such as a bucket, is removably attached to the end of the dipper 82.

Figures 4, 5:
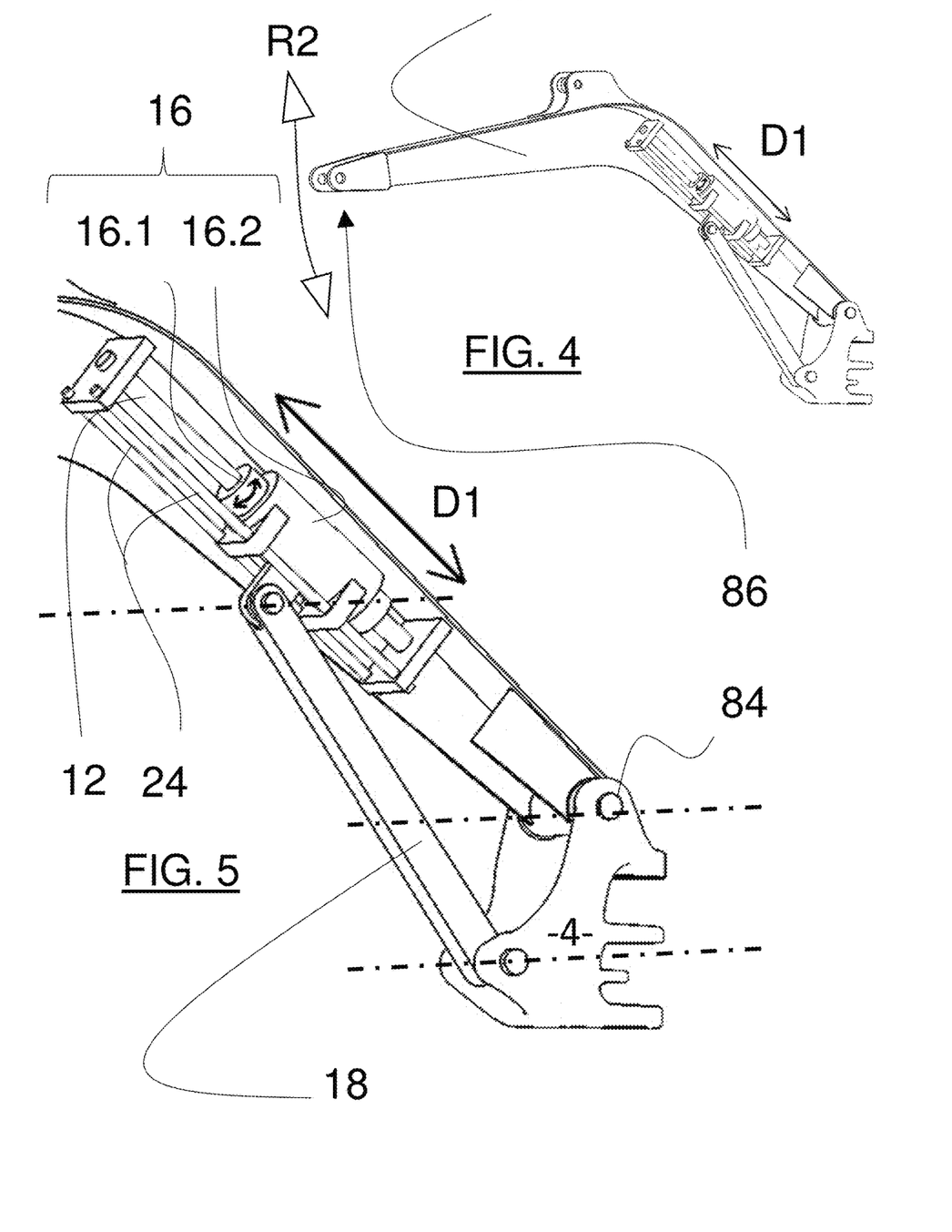
FIG. 4 is a partial and detailed view of the excavator boom according to a second embodiment.
FIG. 5 is an enlarged view of FIG. 4

In reference to FIGS. 1, 4 and 5, Numeral reference 84 denotes the articulation (or hinge) between boom 80 and upper frame 4, Numeral reference 86 denotes the articulation (or hinge) between boom 80 and dipper 82 and Numeral reference 88 denotes the articulation between tool 83 and dipper 82 (Cf. FIG. 1).

As a general rule, and in compliance with the applicable standards, the axes represented in dash dot on the figures are axes of rotational movement. No numeral reference has been added to avoid overloading the drawings.

In known manner, the articulations 84, 86 and 88 allow rotating the boom 80, dipper 84 or tool 83 around an axis of rotation parallel to the ground surface. Accordingly, when the construction equipment lays on a flat surface, said axis or rotation is horizontal. However, in variant, some construction equipment include articulation(s), linked to actuator(s), whose axis of rotation is not parallel to the ground.

In the example, the boom 80 is angle-shaped, which means that it includes two straight segments that delimit between them an angle of approximately 120°.

The construction machine 2 is specific in that it is entirely electric. In other words, the construction machine 2 has neither a thermal engine, nor hydraulics. The continuous tracks 6 are driven by at least two electric motors (not shown), respectively one for each track 6, and the movements of the excavator arm 8 and tool 83 are achieved thanks to electric actuators, respectively three electric actuators 10.1, 10.2 and 10.3 from FIG. 2, whose characteristics are detailed below.

Each actuator consists of a rod 12, extending along a longitudinal axis X12 and a sliding element 14 (which can also be called "carriage"), movable along the rod 12.

Each actuator also comprises an electric motor 16, for converting electrical energy into movement of the sliding element 14 along the longitudinal axis X12. For instance, electrical energy can be supplied from a rechargeable on-board battery pack (not shown), e.g. a Lithium-ion battery pack.

The electric motor 16 is preferably a DC motor, e.g. a Brushless DC motor (BLDC). However, in variant, it could also be an AC motor.

Each actuator further includes a connecting rod 18, comprising a first end 18A which is articulated to the sliding element 14 about a pivot axis perpendicular to the longitudinal axis X12 and a second end 18B which is articulated to a first element of the construction machine 2.

Figure 2:
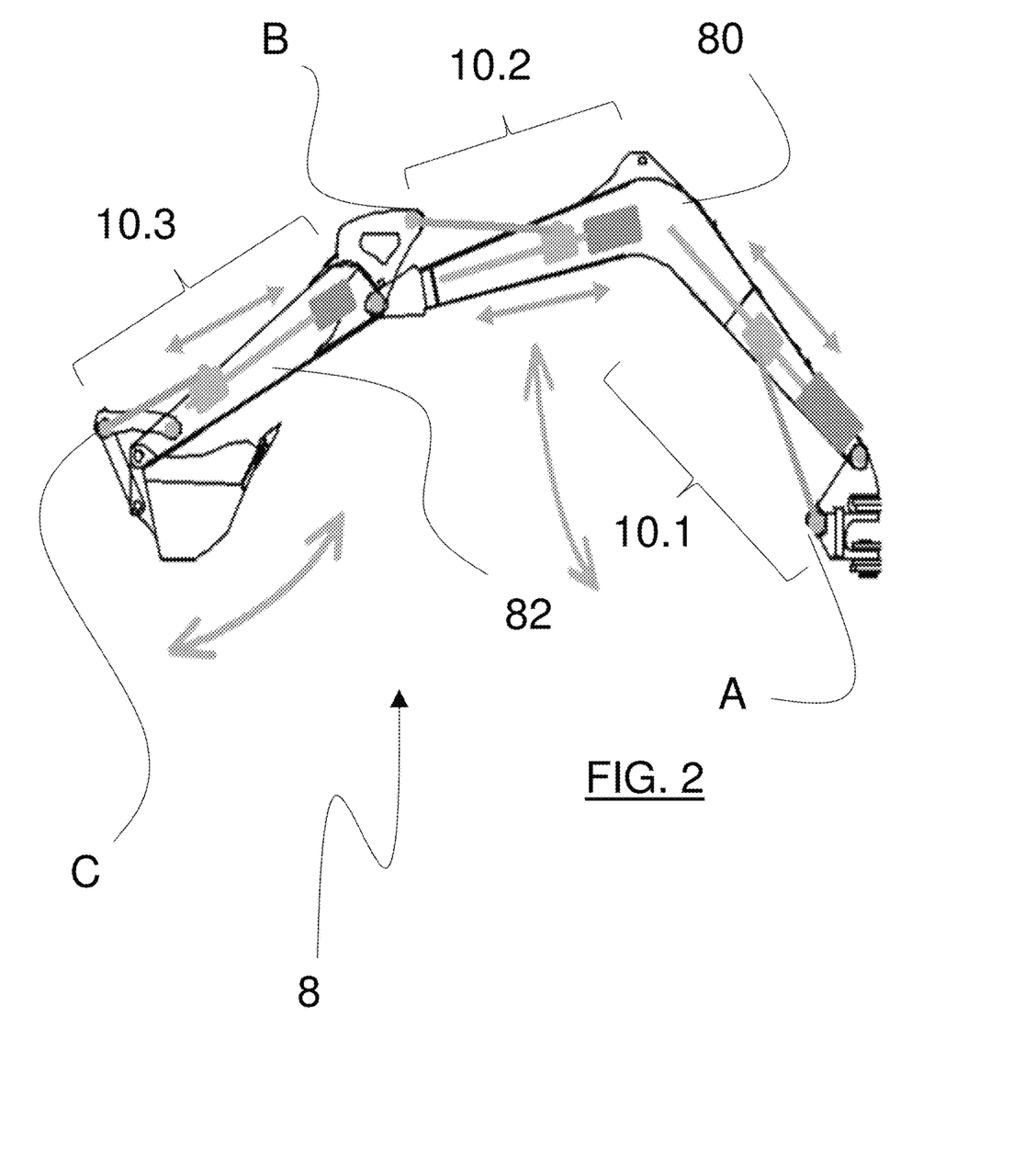
FIG. 2 is a side view of the excavator arm, including a boom, a dipper and bucket.

In the embodiment of FIGS. 1 and 2, the excavator 2 includes a first actuator 10.1 for moving the boom 80, whereby the second end 18B of the connecting rod is attached to a 35 hinge A of the platform/upper frame 4. The excavator 2 further includes a second actuator 10.2 for moving the dipper 82, whereby the second end 18B of the connecting rod is attached to a hinge B of the dipper 82 and a third actuator 10.3 for moving the tool 83, whereby the second end 18B of the connecting rod is attached to a hinge C of the tool 83.

Accordingly, in the embodiment of FIGS. 1 and 2, said first element can be the upper frame 4, the dipper 82 or the tool 83.

In the example of FIG. 2, the hinges B and C to which are attached the second ends 18B of connecting rods 18 are part of the element to be actuated, while hinge A belongs to another element, resp. the upper frame 4.

Advantageously, at least the electric motor 16, the rod 12 and the sliding member 14 are integrated, and then protected into a second element of the construction equipment, such as the boom 80 or dipper 82. Accordingly, rod axis X12 is fixed/immobile relative to said second element. More precisely, the only degree of freedom of rod 12 relative to second element is the rotation about its own axis X12.

Preferably, said second element is part of the metallic structure of the construction equipment 2. As its name indicates, the metallic structure, or carcass, is an assembly of pieces of metal making up the framework of the construction equipment 2.

For instance, upper frame 4 and excavator arm 8 are part of the metallic structure of construction equipment 2. Basically, the metallic structure can be formed by metallic sheets joined together.

Besides, and in order to avoid any confusion or misunderstanding, it is clear that the first and second elements of the construction equipment, to which it is referred to above, are two distinctive elements, which means that it is not one and the same element.

In the embodiment of FIGS. 1 and 2, elements 12, 14 and 16 of actuators 10.1 and 10.2 are integrated into the boom 80 as second element and elements 12, 14 and 16 of actuator 10.3 are integrated into the dipper 82 as second element.

By the expression "integrated into", it is meant that elements 12, 14 and 16 of each actuator are housed or encased inside a sort of protective shield, which is actually part of the machine framework.

Advantageously, said second element 80 or 82 delimits an opening 26, in the form of a slot, which extends in a direction parallel to that of the rod 12, to allow the passage of the connecting rod 18. This opening 26 is particularly visible in FIG. 3.

In the example of an excavator, the boom 80 and dipper 82 are traditionally made from steel plates, potentially associated to casted parts, which delimit an unused hollow volume. The idea here is therefore to use this unused hollow volume to house at least the electric motor 16, the carriage 14 and the rod 12, in order to protect these elements from shocks. It is therefore understandable that, structurally, the carcass of the excavator 2 according to some embodiments which could be described as "100% electric" is similar to that of a traditional hydraulic excavator, except that openings, e.g. opening 26, are created to allow passage of connecting rod 18.

Each actuator also includes guide means to guide the movement of the sliding element 14 along the longitudinal axis X12. These guide means can take several forms, including the one shown in FIG. 3, where the guidance is actually provided by the second element 80 or 82 to which it is referred to above. Specifically, sliding element 14 has a cross-section approximately the same as that of said second element 80 or 82, so that rudimentary guidance is achieved.

Figure 3:
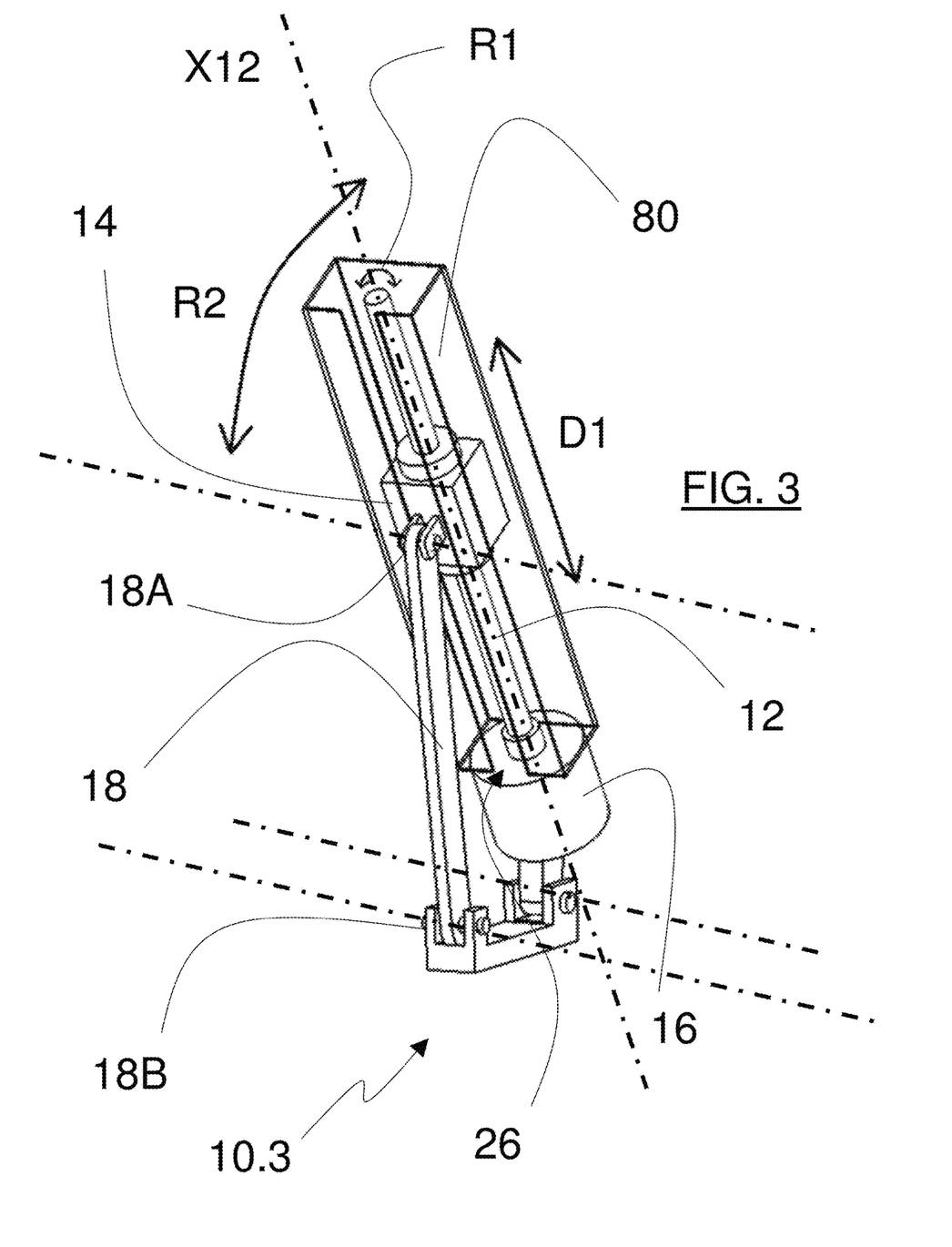
FIG. 3 is a partial and detailed view of the excavator boom, according to a first embodiment.

In the example shown in FIG. 3, sliding element 14 and rod 12 form a helical link (Cf. https://www.wikimeca.org/index.php/Liason_h%C3%A9lico%C3%AFdale). The helical link, or connection, is achieved by contact between two helical surfaces.

For instance, this helical link is achieved by using a ball screw or roller screw mechanism (not shown). The principle of this mechanism is to use rolling elements, such as balls or rollers, to limit friction between the rod 12 and the sliding element 14. As this type of helical connection is well known from the state of the art, no further details are given here. There is a lot of information on the internet on this subject, for example on the following internet pages, the content of which is incorporated herein by reference:

https://en.wikipedia.org/wiki/Roller_screw;
https://en.wikipedia.org/wiki/Ball_screw.

In reference to FIG. 3, when electric motor 16 is switched on (i.e. supplied with electric power), it drives rod 12 in rotation around axis X12, as depicted by arrow R1. Thanks to the helical link, the rotation of rod 12 leads to a translation of the carriage 14 forward or backward along rod 12 (Cf. Arrow D1), depending on the rotation direction of the E-motor 16. As a result, connecting rod 18 pivots around hinge A and forces the boom 80 to rotate around the articulation 84 between boom 80 and upper frame 4 (Cf. Arrow R2). Accordingly, the electric actuator 10.1 forms a simple means to move the boom 80 up or down, depending on the sense of rotation of the E-motor 16.

Typically, the axis of articulation between sliding element 14 and connecting rod 18 is parallel to the axis of articulation between connecting rod 18 and said first element (e.g. upper frame 4, dipper 84 or tool 83) of the construction equipment to which it is referred to above. Also, it can be noted that the axes of articulations provided at the ends 18A and 18B of connecting rod 18 are parallel to the axes of articulations 84, 86 and 88 of the excavator 2.

According to a variant not shown, sliding element/carriage 14 is fixed/fastened to an external body (also known as the "nut" or "nut element") of the ball screw or roller screw mechanism to which it is referred to above, in order to limit the efforts that are transmitted to the ball/roller screw mechanism. This means that the sliding element is not part of the ball/roller screw mechanism as such. Typically, sliding element 14 can be fastened to nut element of the ball/roller screw mechanism using conventional fasteners, such as rivets, screws or bolts.

FIGS. 4 and 5 show a second embodiment. For the purpose of conciseness, only the differences relative to the first embodiment are mentioned below.

In this second embodiment, the main difference with respect to the first embodiment is that electric motor 16 constitutes the carriage/sliding element, i.e. electric motor 16 slides along rod 12. Specifically, the electric motor 16 comprises a hollow rotor, which is engaged with rod 12 by means of a frictionless transmission system such as a ball screw or roller screw system. Thus, the rotor of motor 16 has a "nut" function, inverted commas indicating that it is not a nut in the conventional sense. In this embodiment, and contrary to the first embodiment, rod 12 is fixed in rotation around its longitudinal axis X12.

Also, in this second embodiment, the translational guidance is provided by at least one rail, preferably two rails 24, which extend parallel to rod 12 and are each engaged in a bore of the electric motor as a sliding element. Precisely, the rails are engaged each through a respective hole extending through two brackets supporting motor 16.

In the example, each rail is a cylinder with a circular cross-section, but it is obvious that, alternatively, the cross-section of the cylinder could be different, e.g. rectangular.

In reference to FIGS. 4 and 5, when electric motor 16 is switched on (i.e. supplied with electric power), the rotor 16.1 of the electric motor is driven in rotation around axis X12. Thanks to the helical link, and since rod 12 is fixed in rotation in this embodiment, rotation of the rotor 16.1 is achieved simultaneously with a translation along rod 12. The rotor 16.1 drives the stator 16.2 in translation along the rod. In other words, the motor 16 moves forward or backward along rod 12 (Cf. Arrow D1) as the rotor 16.1 rotates around axis X12, depending on the rotation direction of the E-motor 16. As a result, connecting rod 18 pivots around hinge A and forces the boom 80 to rotate around the articulation 84 between boom 80 and upper frame 4 (Cf. Arrow R2). Accordingly, the electric actuator 10.1 forms a simple means to move the boom 80 up or down, depending on the sense of rotation of the E-motor 16.

Figures 6, 7:
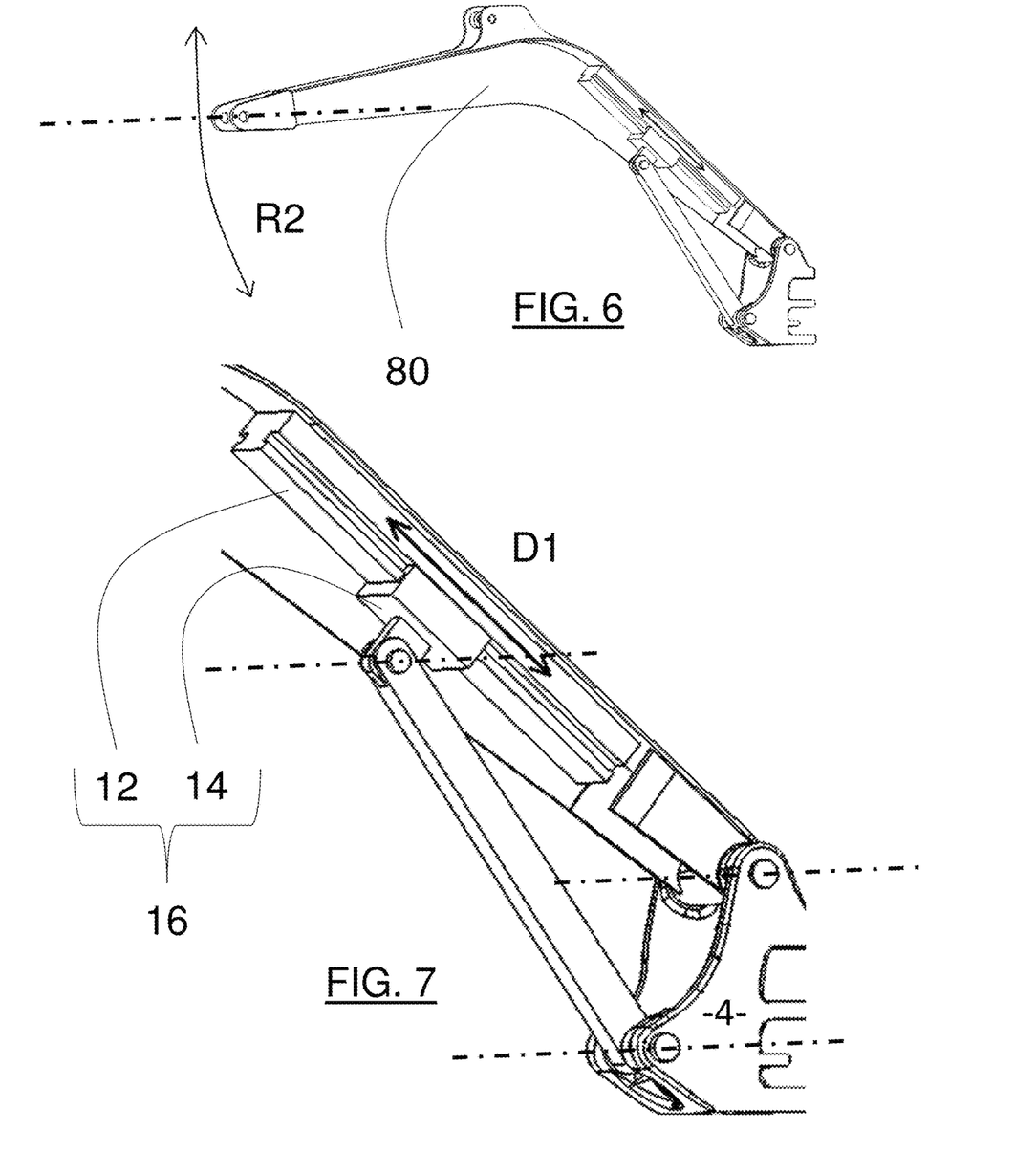
FIGS. 6 and 7 are views similar to that of FIGS. 3 and 4, representing a third embodiment.

FIGS. 6 and 7 show a third embodiment. For the purpose of conciseness, only the differences with respect to the first two embodiments are mentioned below.

In this third embodiment, the sliding element 14 and the rod 12 are connected to each other in the manner of a sliding connection. In this example, the electric motor 16 is a linear motor with a rotor 14 forming the sliding element and a stator 12 forming the rod.

Linear motors in general are, for example, described on the following web page https://en.wikipedia.org/wiki/Linear_motor, the content of which is incorporated herein by reference.

Also, in this third embodiment, the rod 12 takes the form of a rail, with a cross-section comparable to that of a I-beam, but asymmetrical. Carriage 14 has a complementary cross-section, so that carriage 14 is naturally guided in translation along rod 12. Therefore, rail 12 extends inside a groove of sliding element 14, said groove being of complementary shape.

In reference to FIGS. 6 and 7, when electric motor 16 is switched on (i.e. supplied with electric power), the carriage (e.g. the rotor) is driven in translation along rod 12 operating as the stator. In other words, carriage moves forward or backward along rod 12 (Cf. Arrow D1), depending on the control signal transmitted to the E-motor 16. As a result, connecting rod 18 pivots around hinge A and forces the boom 80 to rotate around the articulation 84 between boom 80 and upper frame 4 (Cf. Arrow R2). Accordingly, the electric actuator 10.1 forms a simple means to move the boom 80 up or down.

Figure 8:
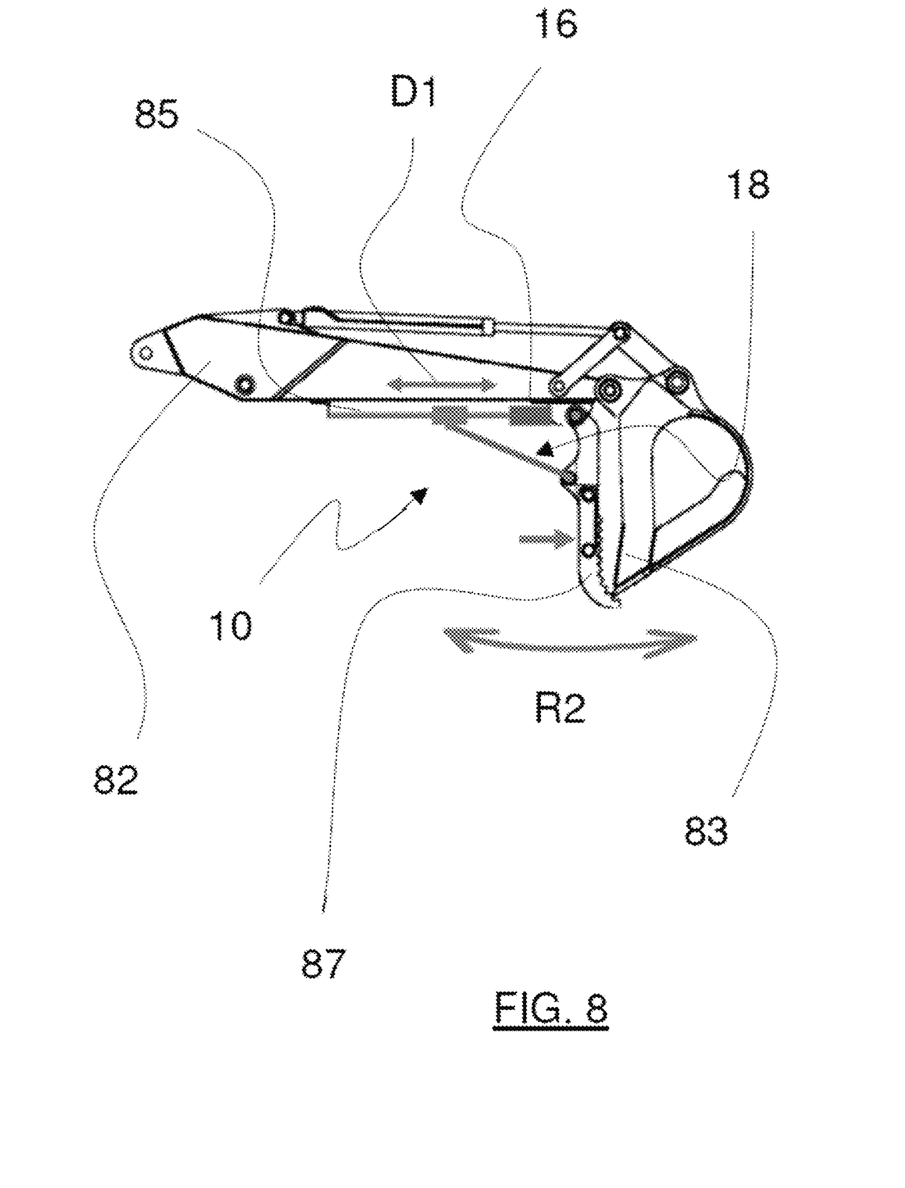
FIG. 8 shows another possible application of some embodiments, according to which the same actuator mechanism can be used to actuate an excavator fitting or attachment, in particular a thumb.

FIG. 8 shows a variant of some embodiments, in which actuator 10 is used to move an accessory (or attachment) on the construction machine, in this case a thumb 87. In general, a thumb makes it easier to pick, hold and move awkward material such as rocks, concrete, branches, and debris that does not fit into the bucket 83.

In this embodiment, and contrary to the previous ones, the protection casing is a box 85 fastened to the machine 2, which means that the protection casing 85 is something that can be fitted a posteriori. In the example, the protection casing 85 is attached below the dipper 82. Accordingly, the electric motor 16, the rod 12 and the sliding element 14 are housed inside this removable box 85, which fulfills as well a guiding function for the carriage 14.

Typically, this protection casing 85 can be easily disassembled from the machine 2. For example, this box could be bolted below the boom 80 or dipper 82. An advantage of this configuration is that it facilitates maintenance operations on the electric motor 16. It also allows conserving the exact same framework relative to a hydraulic construction machine.

Accordingly, the expression "protection casing" has to be interpreted in the broadest possible manner: For instance, a protection casing does not necessarily delimit an enclosed volume: It could be a rectangular box with three sides.

Figure 9:
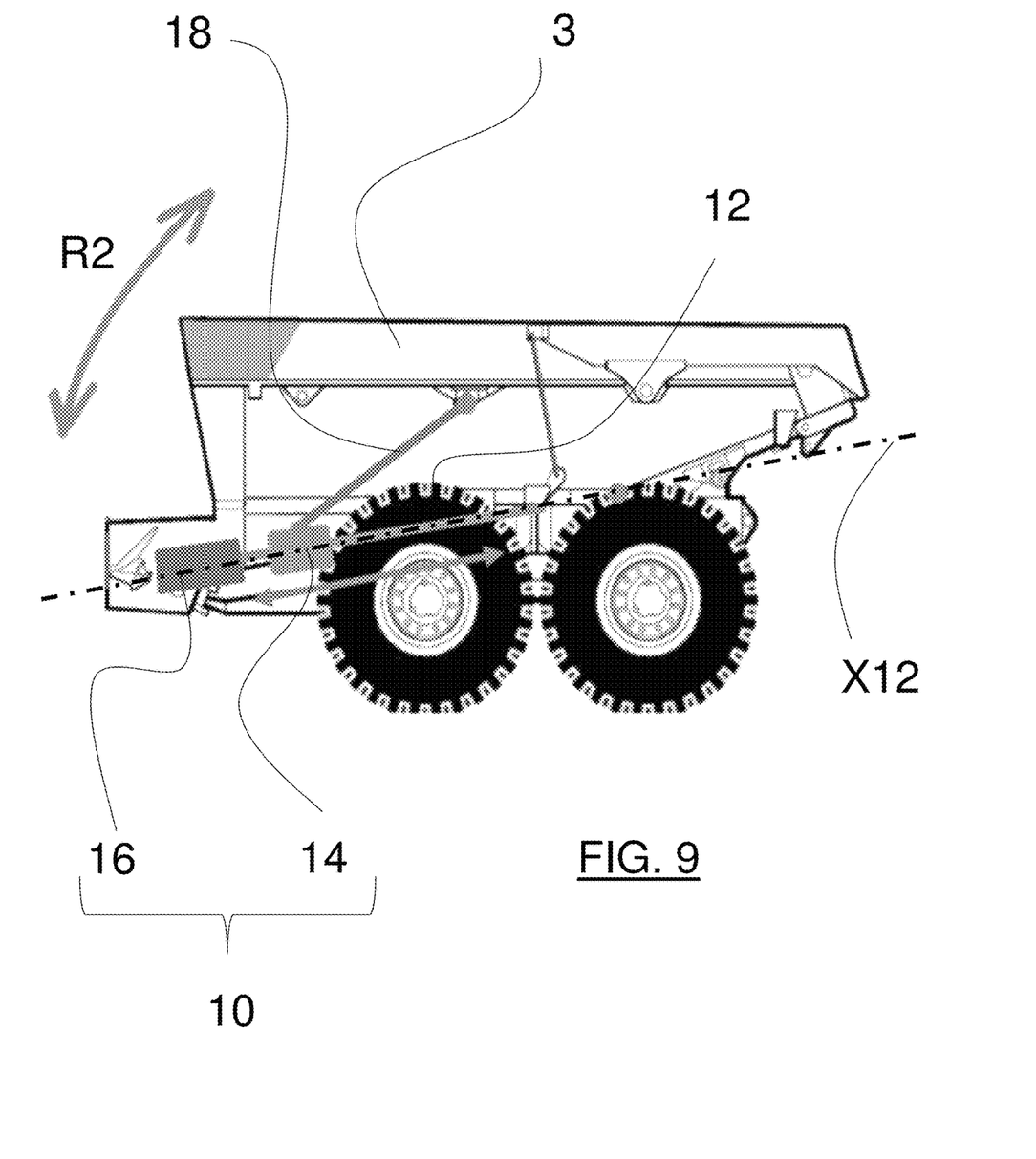
FIG. 9 shows another possible application of some embodiments to a dumper.

FIG. 9 shows another variant of some embodiments, applied to a hauler (or articulated hauler). For the clarity of the drawings, only the rear portion of the hauler is represented herein. In this variant, the electric actuator 10 is used to operate a skip 3 of the hauler, i.e. for tipping the skip up and down.

In this example, when electric motor 16 is switched on (i.e. supplied with electric power), it drives rod 12 in rotation around axis X12. Thanks to the helical link, the rotation of rod 12 leads to a translation of the carriage 14 forward or backward along rod 12, depending on the rotation direction of the E-motor 16. As a result, connecting rod 18 forces the skip 3 to rotate around the articulation between the skip and chassis (Cf. Arrow R2). Accordingly, the electric actuator 10 forms a simple means to tip the skip 3 up and down, depending on the sense of rotation of the E-motor 16.

Figure 10:
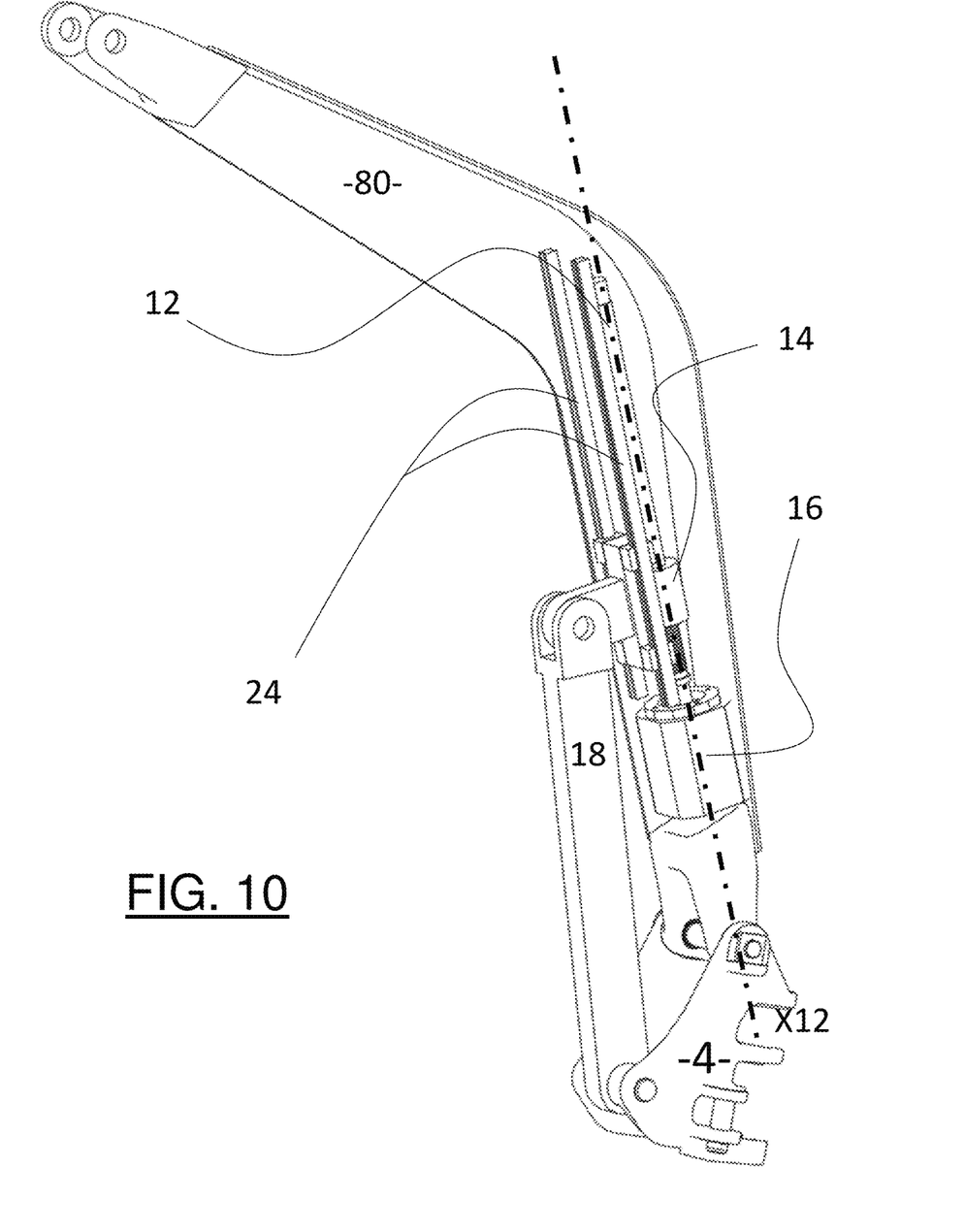
FIG. 10 represents a fourth embodiment.

FIG. 10 shows another variant of some embodiments, in which guiding means comprise two guiding rails 24 extending parallel one to each other along a direction parallel to axis X12. These two rails 24 are fixed relative to second element in the example formed by excavator boom. More particularly, these two rails can be integral with second element, i.e. with boom metallic structure. In the example, the rails 24 provide longitudinal guidance for one carriage/sliding element 14 moving along rod 12. In a variant not shown, the rails can provide guidance for two or more carriages.

Also, in a variant not shown, guiding means could include more than two rails, e.g. three or four distinctive rails.

Figure 11:
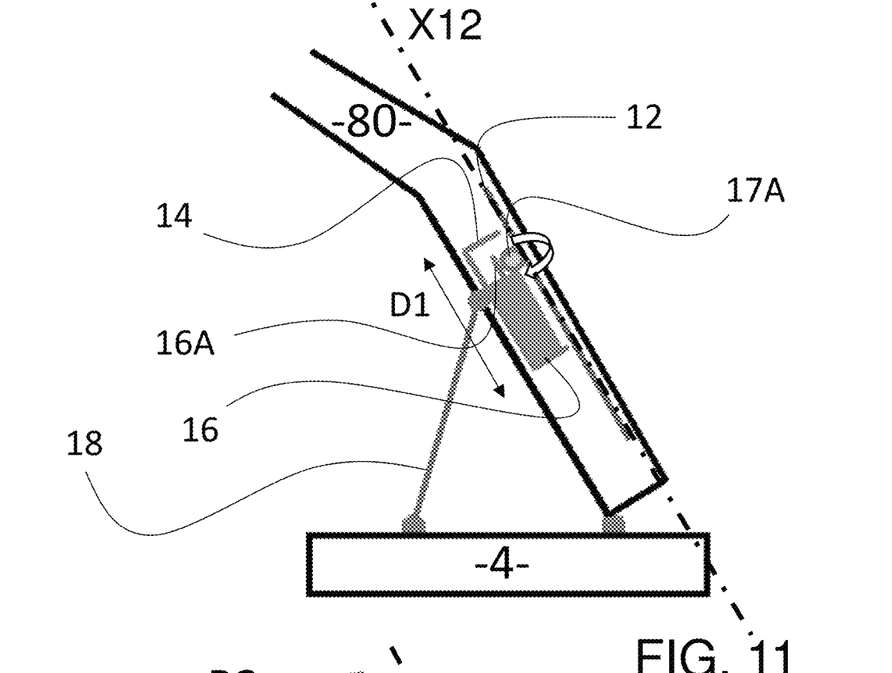
FIGS. 11 and 12 are schematic views representing a fifth embodiment.

FIG. 11 shows another embodiment in which the electric motor and sliding element (carriage) are one and the same element. In detail, the output shaft 16A of the electric motor meshes with a gear wheel 17A (according to a worm drive engagement) which itself meshes with a rack 12 (according to rack and pinion engagement) which can also be considered as a rod similar to that of other embodiments described above. Therefore, rotation of the motor output shaft is transmitted to gear wheel, which induces a translation of the motor/carriage back and forth along the rack (As represented by double sided arrow D1 on FIG. 11), depending on rotation direction of the motor output shaft. The sliding element, comprising the E-motor 16 and a support element 14, is articulated with a first end of connecting rod 18. The other end of connecting rod 18 is articulated on first element of the construction equipment, which is in this specific example upper frame 4.

The guiding of the sliding element 14+16 can be insured by the rack 12, or by a dedicated guiding arrangement (not shown).

In a variant not shown, the system could include more than one rack, e.g. two racks which engage each with one or more gear wheels of the carriage.

Figure 12:
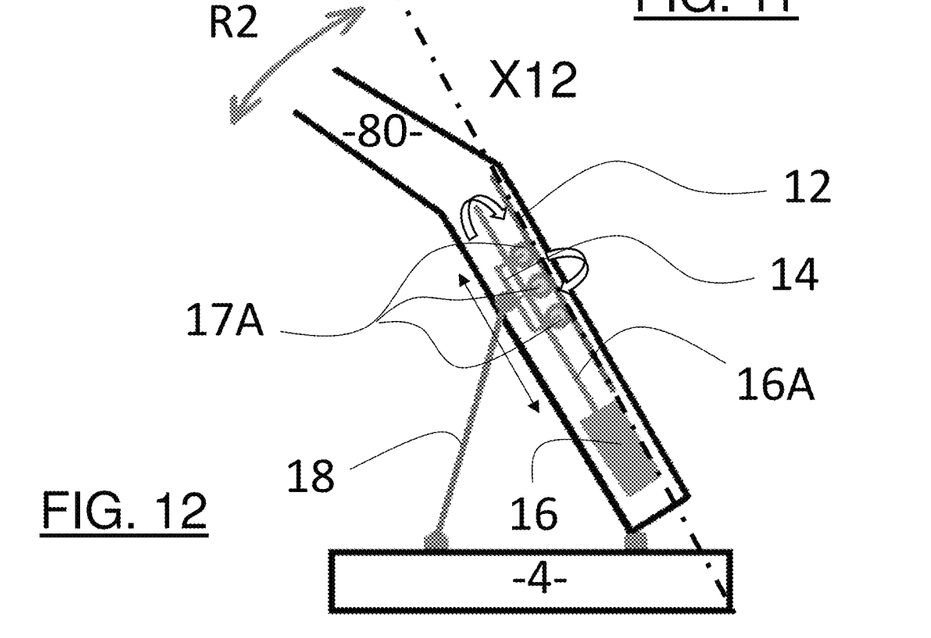

FIG. 12 represents an alternative embodiment, in which the output shaft 16A of the electric motor 16 meshes with at least two successive gear wheels 17A, for example three successive gear wheels 17A, which all engage each with one and the same rack 17B thanks to pinion and rack engagement. Gear wheels 17A are mounted/provided on a support 14 acting as sliding element. Rotation of the motor output shaft induces a rotation of the gear wheels and accordingly a movement along rack 17B. Support 14 is articulated with one end of a connecting rod 18, the function of which is identical to that of the other embodiments described above.

Figure 13:
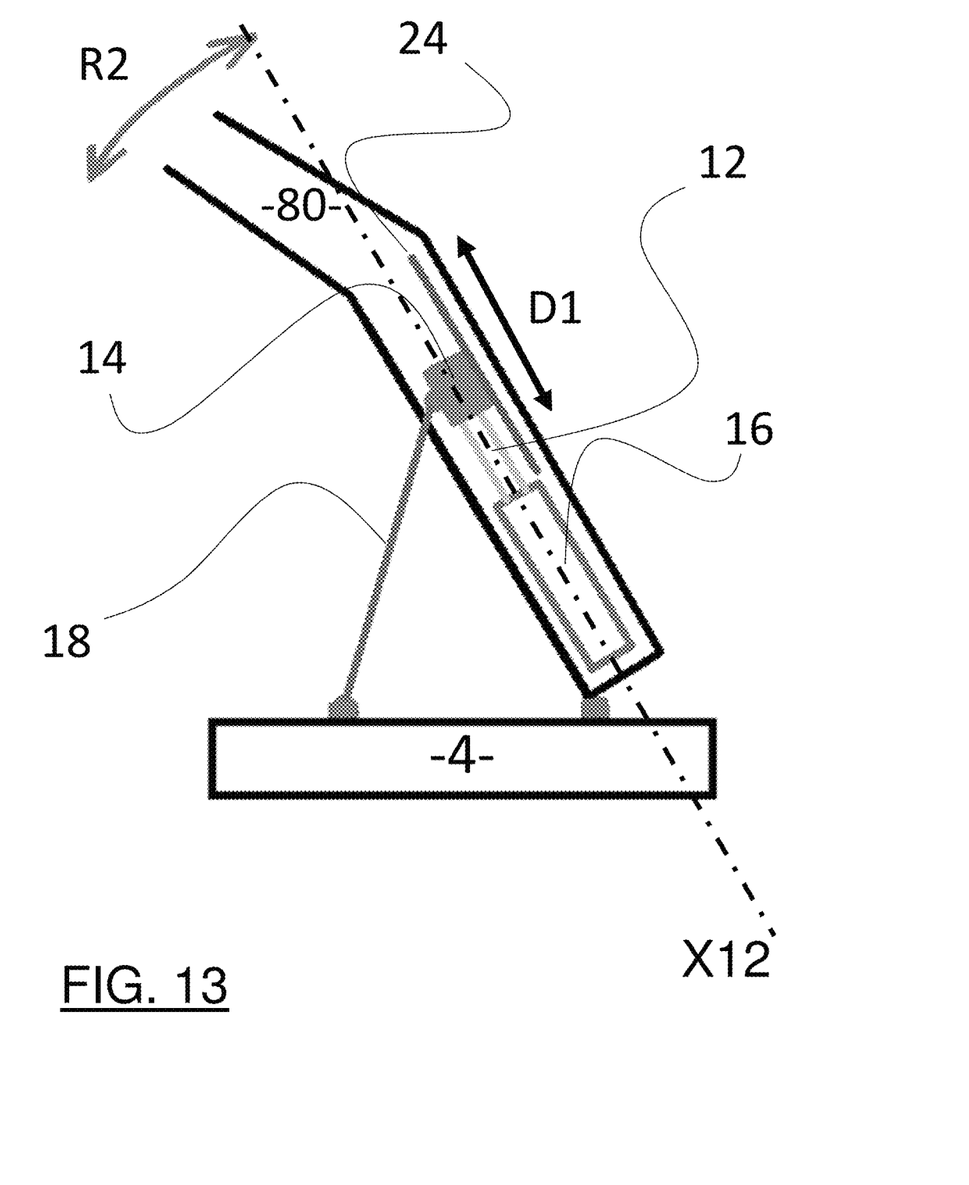
FIG. 13 is a schematic view representing a sixth embodiment.

Last, FIG. 13 shows another embodiment, in which the electric motor 16 is a linear actuator configured to move a rod 12 back and forth. A sliding element or carriage 14 is fixed to the rod 12, in particular at one end opposite to motor 16. As for other embodiments, connecting rod 18 is articulated to carriage 14. Again, rod axis X12 is fixed/immobile relative to second element, which is in the example boom 80.

In a variant not shown, applicable to any one of the described embodiments herein, the assembly of E-motor 16 and rod 12 can move/rotate inside second element, e.g. boom 80, of the construction equipment. These movements are achieved by introducing some functional clearances/pivot points and allow absorbing some deformation.

It is to be understood that the inventive concepts not limited to the embodiments described above and illustrated in the drawings; rather, the skilled person will recognize that many changes, variants and modifications may be made within the scope of the appended claims.

For example, at least one of the actuators described above may include an additional electric motor. Typically, the two electric motors could each be located at one end of the rod 12. Alternatively, the two electric motors could be arranged side by side (i.e. in parallel). These two electric motors may or may not be identical.

Obviously, and in the same spirit, the actuator(s) can include two or more rods 12, regardless of the number of motors 16. For instance, only one motor can be used to drive two rods 12, using an appropriate transmission.

Similarly, the actuator(s) can include two or more sliding elements 14, regardless of the number of rods 12.

Similarly, the actuator(s) can include two or more connecting rods 18, regardless of the number of sliding elements 14.

Also, in another example, two or more actuators can be used to actuate the same element.

In another example, one could very well imagine a configuration where the rod would not be driven directly by the electric motor. In this example, the electric motor could be arranged perpendicular to the axis of the rod and drive the rod by means of an angle gear mechanism, such as a worm and wheel. The choice of configuration depends on the space available for the motor(s). In another example, the E-motor 16 could be arranged parallel to rod 12, (but not coaxial: side by side). Accordingly, a transmission system is provided between motor 16 and rod 12. This transmission system could be a gear set (chain of pinions), a belt or a chain. It also acts as a speed reducer.

In another example, the electric motor could include a speed reducer, typically an epicyclic reducer (planetary gear set).

In another example, at least one of the electric actuators 10 fitted to Construction Machinery 2, preferably each actuator 10, includes a static brake (also known as a "safety brake") to hold the sliding element 14 in place when the electric motor 16 is switched off. Further details of this type of brake can be referred to what already exists on this subject and is described on the following web page: https://fr.wipkipedia.org/wiki/Frien_de_s%C3%A9curit%C3%A9, the content of which is incorporated herein by reference.

In another example, the pivot connections between the elements of actuator 10 may include a cushioning device, such as a bush, to protect the mechanism from shocks or induced forces.

In another example, at least one of the electric actuators 10 fitted to the construction machinery, preferably each actuator 10, includes a position or rotation sensor to provide closed loop or closed loop control of the position of the moving parts of the machine 2.

In another example, construction machine 2 could be equipped with one or more force or torque sensors.

In another example, the or each opening 26 is provided with dust and/or water protection device, such as brush, rubber bands and/or deflector(s).

In another example, the guiding means described above could be supplemented or replaced by wheels, to make the carriage 14 roll along a surface so as to ensure frictionless guidance.

According to a variant not shown, the actuator to which it is referred to in this paper could be used to move the articulated blade of a construction equipment, such as excavator or loader. In known manner, the blade is fastened to the lower frame of the vehicle, typically to the front for pushing material: soil, sand, snow, rubble, or rock during construction or conversion work. In this particular embodiment, lower frame of the excavator or loader can be considered as the "second element" to which it is referred to in this paper.

The invention claimed is:

1. A construction equipment, comprising at least one electric actuator including:
   a rod, extending along a longitudinal axis;
   a sliding member, movable along the rod;
   an electric motor, for converting electrical power into a movement of the sliding member along the longitudinal axis;
   a connecting rod, comprising a first end which is articulated on sliding member and a second end which is articulated on a first element of the construction equipment, in order to move the first element relative to a second element or inversely; and
   guiding means for guiding the movement of the sliding member along the longitudinal axis;
   wherein at least the electric motor, the rod and the sliding member are integrated into said second element of the construction equipment.

2. The construction equipment of claim 1, wherein sliding member and rod form a helical link.

3. The construction equipment according to claim 2, wherein helical link is achieved using a ball screw or roller screw mechanism.

4. The construction equipment according to claim 1, wherein sliding member and rod form a slide link.

5. The construction equipment according to claim 1, wherein the electric motor is a linear motor, comprising the sliding member as a rotor and the rod as a stator.

6. The construction equipment according to claim 1, wherein said second element delimits an opening, typically a slot, for the passage of the connecting rod.

7. The construction equipment according to claim 1, wherein said second element is part of the metallic structure of the construction equipment.

8. The construction equipment according to claim 1, further comprising a static brake to hold the sliding member in place when electrical power is removed from the electric motor.

9. The construction equipment according to claim 1, wherein the first and second ends) of connecting rod are each articulated about a pivot axis perpendicular to the longitudinal axis.

10. The construction equipment according to claim 1, wherein said second element of the construction equipment ensures guiding of the sliding element.

11. The construction equipment according to claim 1, wherein guiding means includes at least one rail extending through a hole of sliding member.

12. The construction equipment according to claim 1, wherein guiding means includes at least one rail extending inside a groove of sliding element.

13. The construction equipment according to claim 1, wherein rod axis is fixed relative to second element.

14. The construction equipment according to claim 1, wherein guiding means are also integrated into second element.

15. The construction equipment according to claim 1, wherein guiding means are fixed relative to second element or integral with said second element.

* * * * *